United States Patent [19]

Metz

[11] Patent Number: 4,572,040

[45] Date of Patent: Feb. 25, 1986

[54] BRAKE ADJUSTMENT TOOL

[76] Inventor: Delano L. Metz, RT N. Manning La., Pocatello, Id. 83202

[21] Appl. No.: 613,305

[22] Filed: May 23, 1984

[51] Int. Cl.⁴ .............................................. B25B 19/00
[52] U.S. Cl. ........................................... 81/463; 7/100
[58] Field of Search ........................... 7/100, 143, 164;
81/463; 173/93.7

[56] References Cited

U.S. PATENT DOCUMENTS

| | | | |
|---|---|---|---|
| 3,435,862 | 4/1969 | Rainey | 173/93.7 X |
| 3,783,956 | 1/1974 | Schultz | 173/93.7 |
| 3,949,816 | 4/1976 | Harvath | 81/463 X |
| 4,050,107 | 9/1977 | Parma | 7/100 |
| 4,268,926 | 5/1981 | Roxton | 7/143 |

FOREIGN PATENT DOCUMENTS

| | | | |
|---|---|---|---|
| 998339 | 9/1951 | France | 81/463 |
| 2097309 | 11/1982 | United Kingdom | 81/463 |

Primary Examiner—James G. Smith
Attorney, Agent, or Firm—Herbert Schulze

[57] ABSTRACT

This invention is a tool for adjusting brakes on automotive trailers and the like. The tool includes an end suitable to engage the brake adjusting stud, or bolt and incorporates hook means for testing the brake adjustment requirements by contacting the slack adjustment arm. The tool further incorporates impact means for impacting to release frozen studs or bolts and includes tire checking apparatus. It includes an elongated connecting means connecting the stud engaging means to the handle means such that it is unnecessary for the operator to move under the vehicle in close proximity to the slack adjustment arm to make the adjustment.

5 Claims, 18 Drawing Figures

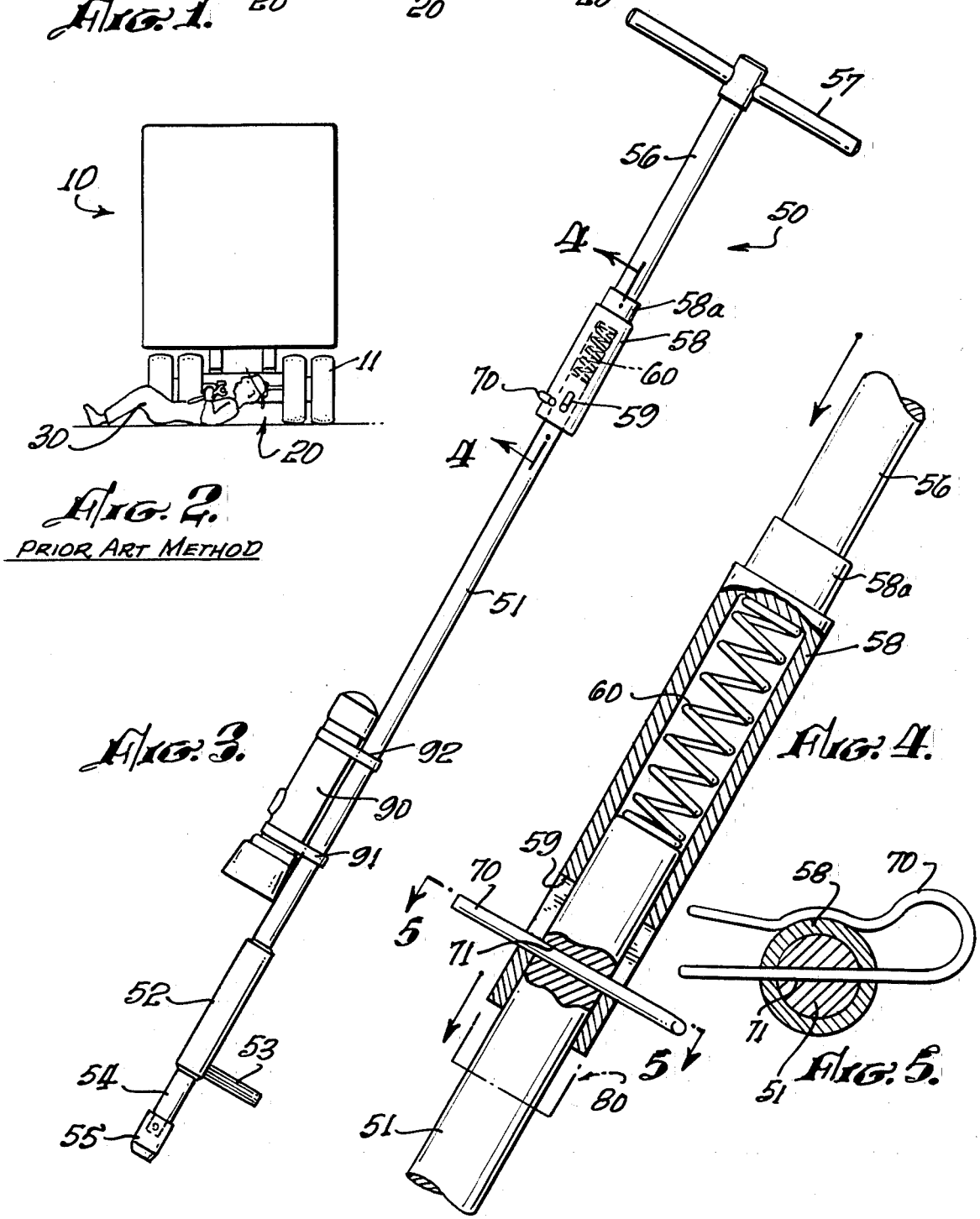

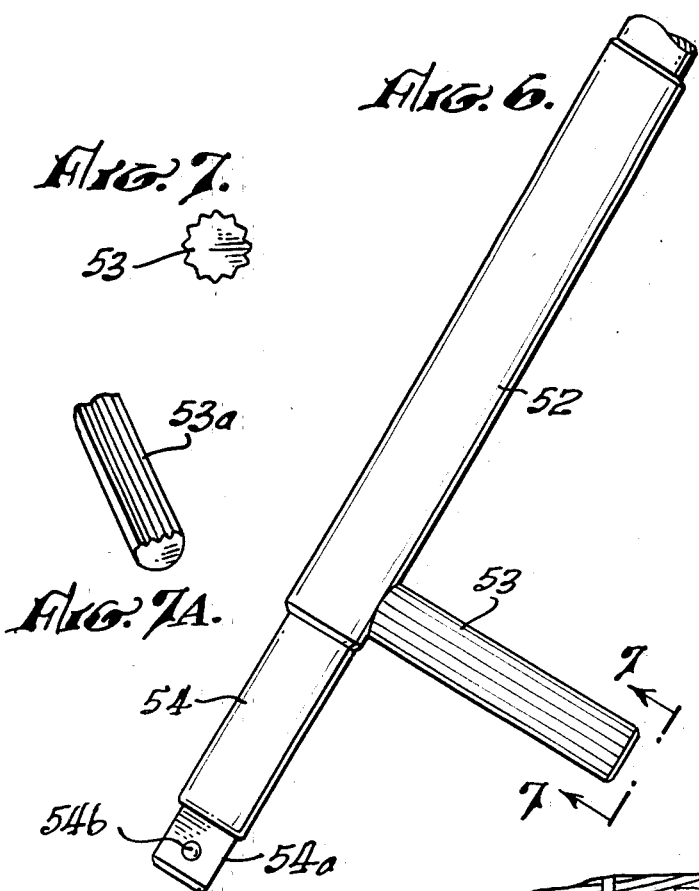

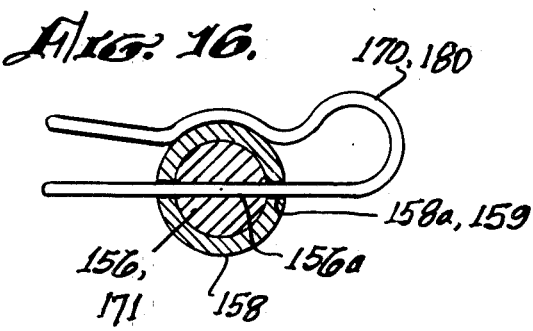
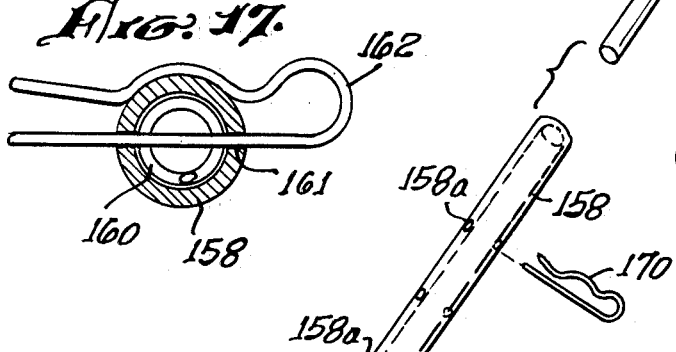
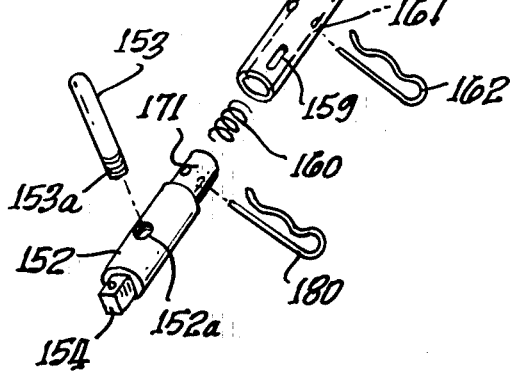
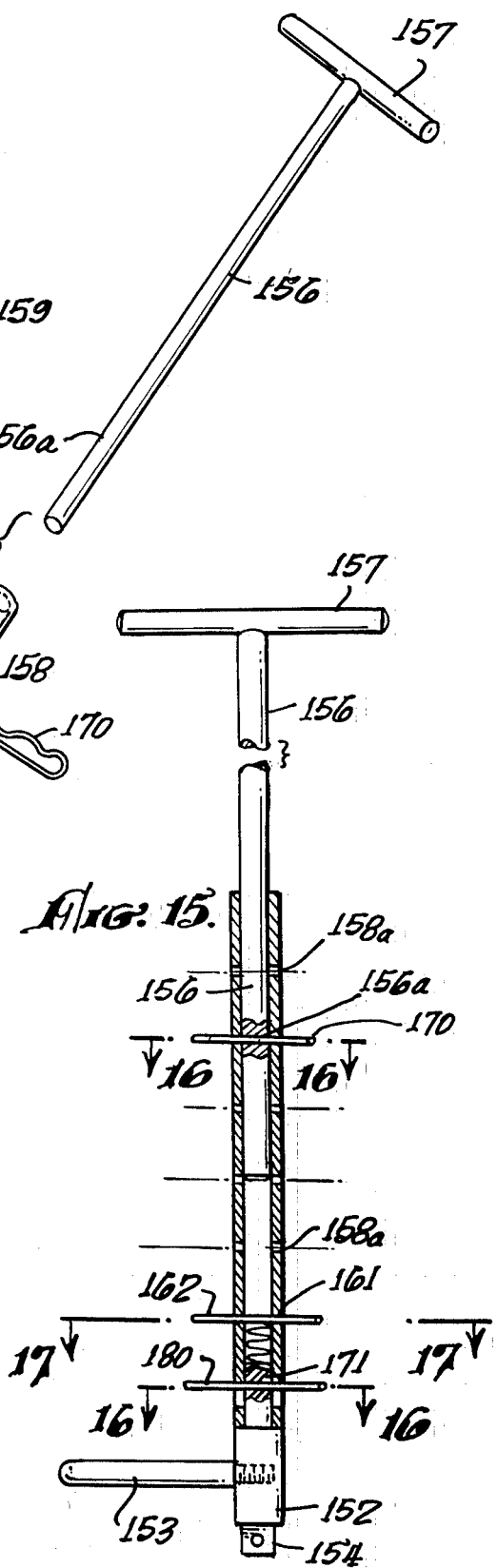

BRAKE ADJUSTMENT TOOL

CROSS REFERENCE TO RELATED PATENT APPLICATIONS

There are no patent applications related to this application filed by me, with the exception of design patent application being submitted concurrent herewith entitled "Brake Adjusting Tool".

BACKGROUND OF THE INVENTION

1. Field of the Invention

This invention is in the general field of tools for tightening or loosening bolts and studs. The invention is even more particularly in the field of such a tool having elongated means interconnecting the stud or bolt engaging apparatus with handle means suitable to turn said stud or bolt engaging means. It is further directed to such an apparatus wherein impact means is built into the tool in order to impact and thus loosed adjusting studs or bolts which have become frozen and will resist gurning. The device is even more particularly directed to an apparatus as heretofore outlined and which incorporates means for testing the brake slack adjustment arm.

2. Description of the Prior Art

There is absolutely no prior art known to me to accomplish the results nor perform the duties of the tool of the present invention. All prior art has to do with devices which must be used in close proximity to the brake adjustment stud meaning that it is necessary with all prior known tools to crawl under the truck in close proximity to the adjustment area. Also, there is no art known to me of a tool for this purpose with a built in impact apparatus, it always having been necessary in the past to utilize a hammer or other such device in order to impact for loosening of such adjustments screws.

SUMMARY OF THE INVENTION

It is customary for automotive trucks, trailers carried by automotive truck tractors, and the like, to have brake adjusting apparatus generally consisting of a stud or the like which can be loosened or tightened to affect the condition of the brake as to its ability to properly engage. It is also customary to have a slack adjustment arm cooperative with such adjustment such that by testing the arm, the condition of brake adjustment can be ascertained.

The slack adjustment arm and the brake adjustment stud itself, are generally located under the vehicle adjacent the axel at a position where the truck driver or other person testing or making adjustments must crawl under the truck. Such procedures are time consuming, dangerous, and, particularly when a truck has been running under rain, snow, or other adverse conditions, very dirty and unpleasant work. The cost to the truck owners or those doing adjustment is quite significant.

I have studied this problem for some period of time and the factors which must be considered are:

1. A device must somehow test the slack adjustment arm in order to determine the adjustment necessary, if any is necessary;
2. A device must be available to grip and turn the adjustment stud;
3. An impact device must be available to impact the adjustment stud when the same, or the spring which maintains it under tension is frozen; and
4. Whatever is used should preferably be carried within a standard truck tool box.

After considerable study, innovation, and experimentation, I have now conceived and developed an ideal tool by which the vehicle brakes may be tested as to adjustment and then adjusted as required without the necessity of going beneath the vehicle and without the necessity of special impact devices or the like. I have also incorporated a preferred structure in which the device will fit within a customary truck tool box.

I have accomplished the desired purpose of constructing an elongated device having means on one end suitable to engage the head of an adjusting stud, incorporating within itself a self returning impact means, incorporating collapsing means; and incorporating testing means and means to turn the adjusting stud or bolt. As an added feature, I have so designed the handle of the apparatus that it can be used to test truck tires to determine if they are at a reasonable air pressure.

It is an object of this invention to provide a tool by which brake adjusting studs on vehicles can be adjusted without the necessity of crawling under the vehicle.

Another object of this invention is to provide such a tool as has been described wherein the same tool may be used to test the slack adjustment arm.

Another object of this invention is to provide such a tool as has been described wherein there is a self contained impacting arrangement for those cases where it is necessary to impact the adjustment screws to enable them to turn.

The foregoing and other objects and advantages of this invention will become apparent to those skilled in the art upon reading the description of a preferred embodiment, which follows, in conjunction with a review of the appended drawings.

BRIEF DESCRIPTION OF THE DRAWINGS

FIG. 1 is an elevational view of a truck tractor and trailer;

FIG. 2 is a rear elevational view on FIG. 1, somewhat enlarged, and showing the method of adjusting brakes heretofore required;

FIG. 3 is a side elevational view of a preferred apparatus with certain elements in phantom for performing the brake adjustment previously done in the manner shown in FIG. 2;

FIG. 4 is an enlarged partial section on 4—4 of FIG. 3;

FIG. 5 is a section on 5—5 of FIG. 4;

FIG. 6 is an enlarged view of the slack adjusting arm testing portion of the apparatus of FIG. 3;

FIG. 7 is a view of the end of element 53 of FIG. 6;

FIG. 7A is a perspective of a portion of an alternate embodiment of the element 53;

FIG. 8 is a partially broken away view of the connection between the device of this invention and the brake adjustment bolt;

FIG. 9 is an alternate embodiment of an apparatus to contact the brake adjustment bolt when using the device of the invention;

FIG. 10 is a view of the device of this invention in reduced scale indicating how it may be broken down for storage;

FIG. 11 is an illustration of testing of the brakes slack adjustment arm with the device of this invention;

FIG. 12 is an enlarged partially broken away partially sectioned view of the slack adjusting apparatus using the device of this invention;

FIG. 13 is an illustration of the use of the handle of this apparatus for testing tires;

FIG. 14 is an exploded perspective of an alternate embodiment of the apparatus of this invention;

FIG. 15 is a partially sectioned, partially broken away view of the apparatus of FIG. 14;

FIG. 16 is a section of the immediate area 16—16 without showing some of the items which would be in the background;

FIG. 17 is a section on 17—17 of FIG. 15 without a view of elements which would be in the background.

DESCRIPTION OF A PREFERRED EMBODIMENT

FIG. 1 illustrates a side elevation schematically of a truck with trailers generally 10, with various brake adjusting areas indicated at 20. Each of the brake adjusting area will be quite similar to each of the others and the adjustment required will be uniform.

FIG. 2 shows a truck operator 30 attempting to adjust the brake adjustment apparatus generally 20 indicating the close proximity to the wheels 11 which is necessary in view of the location of the brake adjustment apparatus which is shown in more detail in FIG. 11.

FIG. 3 shows a preferred embodiment of this invention generally 50. The device consists of an elongated member 51, a portion 52 connected to or integral with 51 and another portion 54 culminating in an area shown in phantom suitable to accept a socket wrench 55. An arm 53 is fastened to the area 52 by welding or other suitable means and its function is to test the slack adjustment arm of the brake adjusting mechanism.

The element 51 is provided with a hole 71 (as shown particularly well in FIGS. 4 and 5 which should be studied together with FIG. 3 at this point). A cotter pin or the like 70 extends through a pair of slots 59 on opposed sides of sleeve 58, which sleeve 58 carries a spring 60 which presses against a plug member 58A and the end of rod 51. The portion 58A is connected to or integral with rod 56 which is connected by welding or the like to handle 57 by means known to those skilled in the art.

A flashlight 90 may be connected by straps 91 and 92, or the like, to the rod 51 for providing light when necessary to assist in the operations which will be hereinafter described.

Looking again at FIGS. 3,4, and 5 it will be seen that by downward pressure against the handle the element 58 will be caused to move the length of the slot 59 and will terminate at the position approximately 80 in phantom. By this means, and by a rapid push against the handle 57, an impact will be imparted to the socket wrench 55 against the brake adjusting stud or bolt as will be shown particularly well in FIG. 12.

More detail concerning the end of the tool which will be used to actually contact the brake adjustment stud are shown in FIGS. 6, 7, 7A, 8 and 9. The element 53 is shown to be knurled or otherwise formed to as to provide a good gripping surface against the slack adjusting arm when it is contacted. While this is not absolutely necessary it is felt to be an important consideration.

The element 53A would be substituted for the element 53 and would have a flattened and preferably roughened surface as indicated in FIG. 7A. It could be preferable for some purposes to have the flattened area rather than a generally round exterior. The element 54 will terminate in a square or otherwise appropriately shaped area 54A usually having a spring loaded ball 54B as is known to those skilled in the art, so that the socket wrench end 55 can slip over the portion 54A. The socket used at 55 will be that socket which will be the same size as the stud or bolt being used, and most of these are uniform in size.

As shown at FIG. 9, the socket member which may engage the adjusting head 102 could be one of the nature which is known to those skilled in this art and has a universal joint type arrangement so that in the event the particular adjusting stud is located in a difficult area or with an obstruction in front of it it can be used with the universal connection.

FIG. 10 shows the tool of FIG. 3 without some of the elements schematically and taken apart merely for purposes of illustrating that it can be taken apart and thus shortened in its overall length for storage in a tool box if desired.

FIG. 11 shows the manner in which this device will be used to test the slack adjusting arm 101. Virtually all of the brake adjustment devices have a slack adjustment arm 101 of the nature shown. By reaching in as indicated and contacting the slack adjustment arm with the element 53 of this tool as shown the slack can be accurately ascertained. It is of course much more difficult and less satisfactory to attempt to do this when laying on the ground under the vehicle. When the slack adjustment arm has been tested, the slack adjustment stud or the like 102 will be engaged by the use of the socket 55 on the device of this invention as shown in FIG. 12. Generally speaking the stud 102 will have a spring or the like 102A which maintains tension. Frequently this will become caught with dirt, or otherwise frozen in such a way that proper adjustment can not be made without breaking it loose. In the past it has been necessary to go under the truck with a hammer of the like and hit the head of the stud 102. With the impacting arrangement of this particular tool, however, as previously described and consisting of the ability to move as shown in FIG. 4, it is possible for the operator to merely push sharply on the handle 57 and he gets an impact which is quite effective in breaking loose any stubborn sticking or frozen spring areas.

As shown in FIG. 13, the handle of this tool makes an exceptionally excellent device for testing tires for proper air pressure. It is quite common to see truck drivers kicking tires for this test but such a test does not give the response that the end of this handle will.

FIGS. 14, 15, 16 and 17 illustrate an alternate embodiment of this tool wherein the principle advantage is an arrangement by which the length of the tool may be altered to accommodate different conditions of overhang of the vehicle over the brake adjustment area. In this particular embodiment the handle 157 is connected by welding or the like to rod 156 which has a hole extending through its diameter at 156A. The rod slips within the cylinder 158 which has a number of drill through holes 158A. The cotter pin 170 can slip through the hole 156A and whichever of the holes 158A as may be desired to lock the handle and the device in a particular length or configuration.

The cotter pin 162 will slip through the hole 161 drilled through both sides of the tubular member 158 to provide a stop for the spring 160. The throat 171 has a hole through its diameter in alignment with slot 159 (one on each side of member 58, only one of which is shown in this view). The element 171 will be welded or otherwise fixed into the sleeve 152 and thus it will be seen that when desired to impact the impacting effect will be through the movement of the cotter pin 180 in the slot 159.

In this case the slack adjusting arm member 153 is shown to be threaded at 153A and is threaded into the threaded hole 152A in order to provide the ability to substitute a different type of slack adjusting arm testing member if desired. The end 154 of course is for accepting a socket wrench and for performing the adjustment as heretofore described.

It should be observed that there are two indications of 16—16 on FIG. 15 but each of these appears to be the same when viewed without the elements in phantom and only one has really been shown although both applicable numbers are shown on FIG. 16.

While the embodiments of this invention shown and described are fully capable of achieving the objects and advantages desired, it is to be understood that these embodiments have been shown for purposes of illustration only and not for purposes of limitation.

I claim:

1. Apparatus for use in testing and adjusting vehicular brakes comprising in cooperative combination: handle means suitable to be handled by an individual; connecting means connecting said handle means to an impact means; socket engaging means connected to said impact means and depending from said impact means in a direction opposite to the handle means; and slack adjustment arm means connected to said socket connection means intermediate its ends.

2. The apparatus of claim 1 wherein a light emitting means is connected to said socket engaging means.

3. An apparatus for adjusting brakes on vehicles comprising in combination: a hollow tubular member having opposed slots adjacent one end and a first elongated solid extension connected to its other end; handle means connected to said first elongated solid extension; a spring within said hollow member adjacent the end to which said first elongated solid extension is affixed; a second elongated extension inserted into the other end of said hollow tubular member adjacent the said slots; a hole through said second elongated solid extension; retaining means inserted through the slot in said hollow tubular member and the hole in the second elongated solid extension suitable to hold the two together but to allow movement for the length of the slot; slack adjustment arm engaging means adjacent the other end of said second elongated solid extension; and socket engaging means at the terminal end of said second elongated solid extension.

4. The apparatus of claim 3 wherein the handle means is suitable for testing tire pressure.

5. Apparatus for adjusting brakes on vehicles comprising an elongated tubular member containing a series of diametrically opposed holes over its length at spaced intervals and containing a pair of diametrically opposed slots adjacent one end and intermediate that end and one of the pairs of diametrically opposed holes; retaining pin means inserted through the diametrically opposed holes next to said slot means; spring means contained within said elongated tubular means intermediate said pin means and said diametrically opposed slots; a first elongated solid member inserted at one end within said tubular member and having a diametric hole therethrough; pin means inserted through said slots in said tubular member and through the said hole in said first elongated solid member; socket accepting means at the other end of said first elongated solid member from said hole; slack adjusting arm testing means connected to said first elongated solid member intermediate its ends; a second elongated solid member having a hole diametrically therethrough adjacent one end of said second elongated solid member, inserted within said tubular member; pin means inserted within one of the diametrically opposed pair of holes and the hole in said second solid elongated member; and handle means connected to the end of said second solid elongated member which end is not the end having the hole adjacent thereto.

* * * * *